3,103,023
ASSEMBLY APPARATUS
John S. Zdanis, Watertown, Conn., assignor to The Siemon Company, Watertown, Conn., a corporation of Connecticut
Filed Nov. 4, 1958, Ser. No. 771,869
5 Claims. (Cl. 10—155)

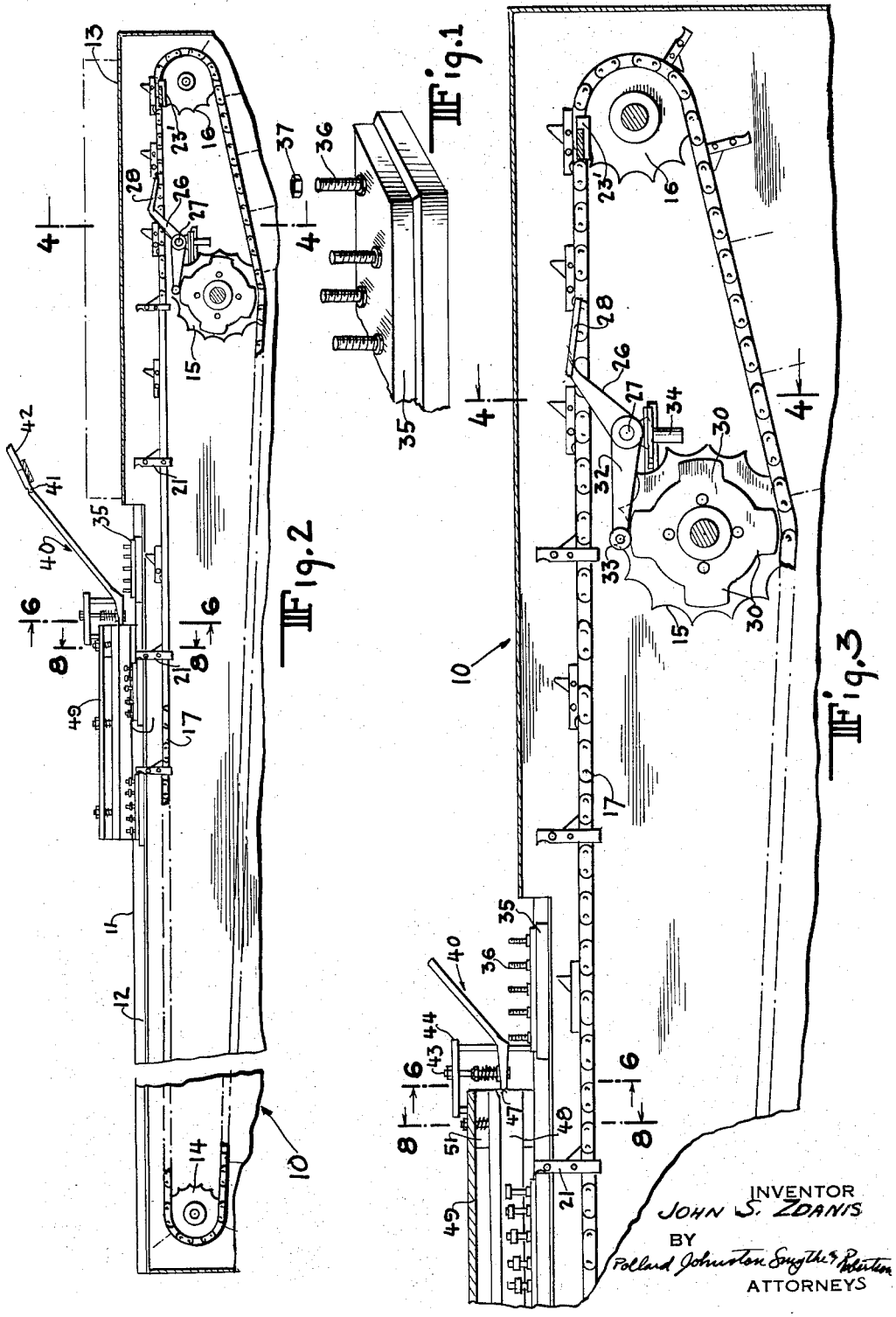

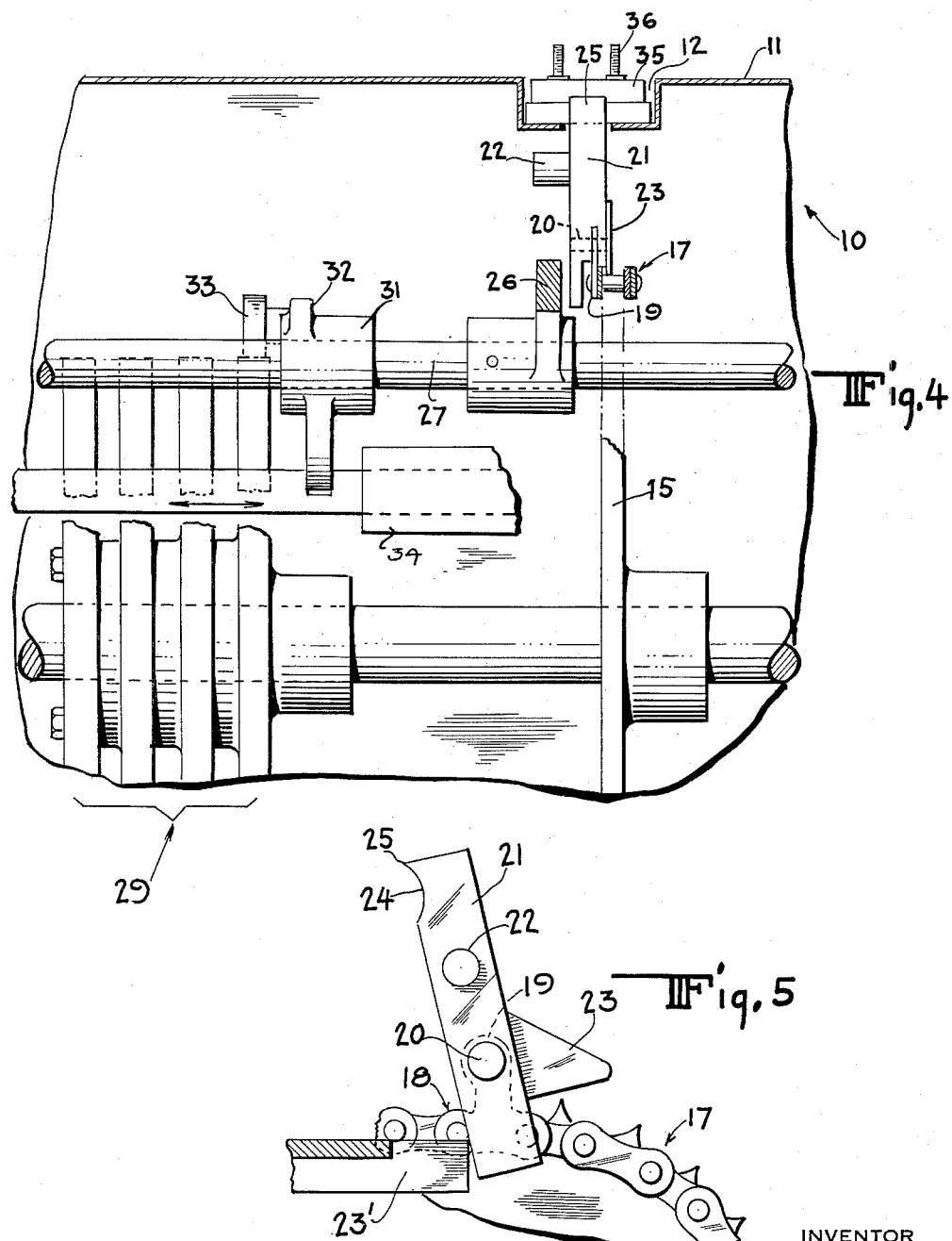

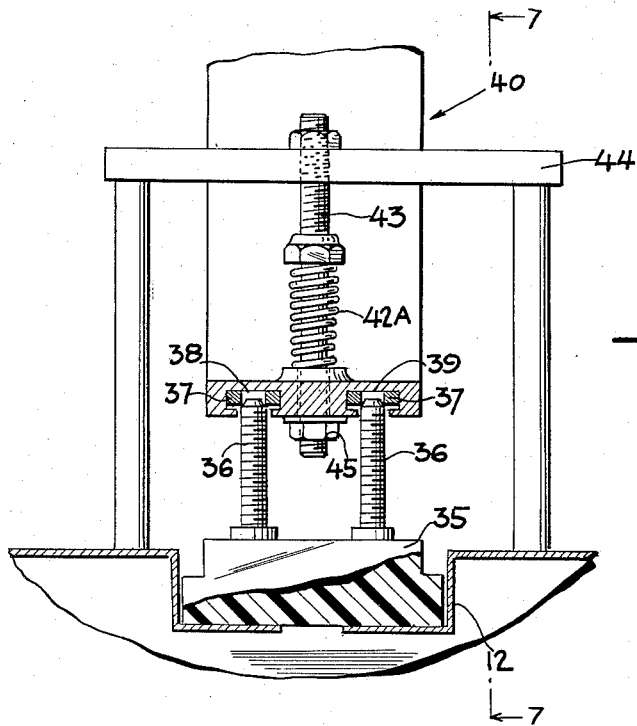
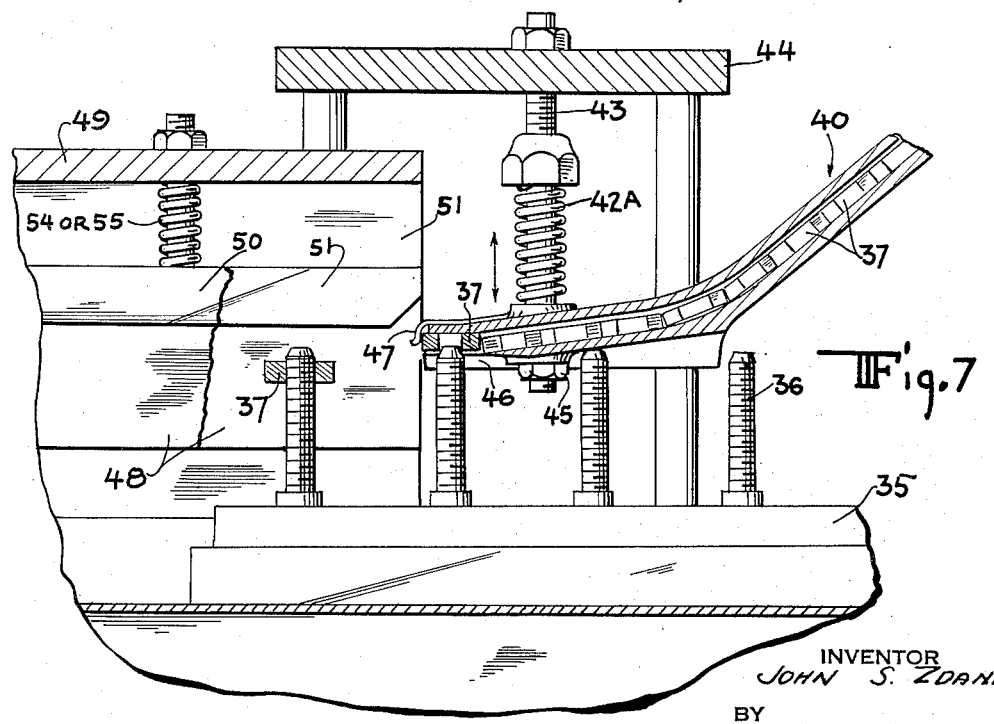

The present invention relates to automatic machines for assembling nuts onto screws and particularly to a new and improved machine of this type for assembling nuts onto terminal screws fixedly mounted in a board as the board progressively moves through the machine.

The principal object of this invention is to provide a nut and screw assembling machine in which the nut is transferred directly to a non-rotatable screw that is moved along a path in such a manner to cause the nut to rotate and thereby become assembled to the screw.

Another object of the invention is to provide such a machine in which no intermediate handling device is employed between the screw and the nut chute leading from a hopper.

Another object of the invention is to provide such a machine in which a conveying belt, chain or the like progressively moves terminal blocks containing aligned, spaced, non-rotatable screws past a nut chute where nuts are deposited directly from the chute to the top of screws, thence along stationary friction providing means that rotate the nuts during the travel of the block along said friction providing means.

Another object of the invention is to provide such a machine in which means on the conveyor may be selectively activated to engage terminal blocks of different lengths.

One aspect of the invention may be to provide an endless conveyor arrangement which may take any form although in the embodiment disclosed, an endless chain type is shown. Pivotally mounted links may be located at equally spaced intervals along the endless chain. In one of their pivotal positions they are adapted to engage the end of terminal blocks that are placed on the conveyor, and in their other pivotal position they are ineffective to engage such blocks.

A pivotally mounted chute leading from a hopper may include an angularly disposed terminal portion at a position adjacent the top of the terminal screws so that the top portion of each screw passes between legs of bifurcated portions of the terminal portion. Resilient clip means may limit the downward travel of the nuts at the terminal portion of the chute and may act to hold each nut in a position to be directly engaged and picked up by the top portion of a screw. The arrangement may be such that continued movement of the conveyor causes the spring clip to release the nut by raising the pivotal chute slightly simultaneously as the nut periphery is engaged by stationary, resilient, friction providing means located along the path of travel of the conveyor. Continued movement of the conveyor will cause the nuts to be threaded onto the terminal screws on which they have been placed.

In another aspect of the invention, means may be provided for rendering selectively effective the pivotal links on the conveyor to engage the terminal blocks so as to load the machine in the most economical manner. This means may include pivotally mounted arm means on the free end of which may be located a guide for engaging stud means on each pivotal link and for tilting the link from a normally prone position to an upright position. In one position of the arm means, the guide may engage the stud means on each link, and in another position may be ineffective to engage said stud means.

In another aspect of the invention, a manually shiftable and pivotally mounted arm means may be connected to the pivot for the guide arm means, and it may support a cam follower at its free end. Separate rotatable cams may be provided, each having different peripherally spaced lands thereon. Accordingly, pivotal action of the stud engaging guide means will be at different intervals depending upon which cam cooperates with the follower on the shiftable pivotal arm. In this way, different distances may be provided between succeeding upturned links on the conveyor chain thereby to accommodate terminal blocks of different lengths.

Other objects, features and advantages of the invention will become apparent from the following specification and accompanying drawings which are merely exemplary.

In the drawings:

FIG. 1 is a perspective view of a portion of a terminal block having stationary screws therein on which nuts are adapted to be screwed;

FIG. 2 is a sectional elevational view of a machine to which the principles of the invention have been applied;

FIG. 3 is an enlarged sectional elevational view of a portion of the machine shown in FIG. 2;

FIG. 4 is a sectional elevational view taken substantially along line 4—4 of FIGS. 2 and 3;

FIG. 5 is a fragmentary elevational view of a portion of the chain and sprocket employed as the conveyor;

FIG. 6 is an elevational view taken substantially along line 6—6 of FIGS. 2 and 3;

FIG. 7 is a sectional elevational view taken substantially along line 7—7 of FIG. 6;

Figure 7A:
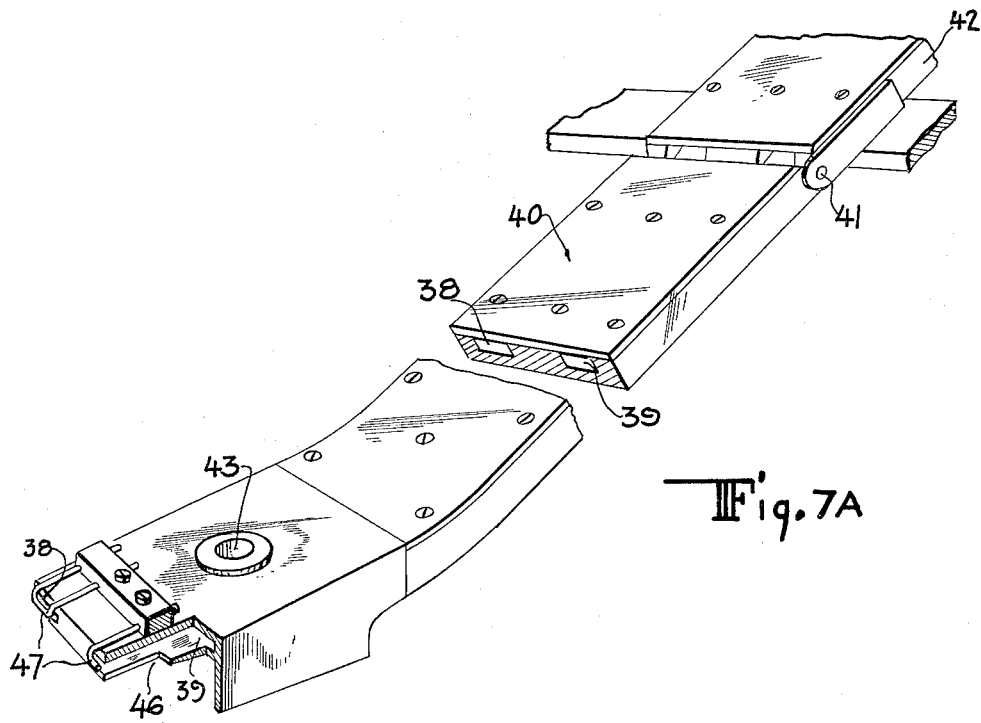
FIG. 7A is a perspective view of the chute of FIG. 1.

Referring to FIGS. 2, 3 and 4, the principles of the invention are shown as applied to a table-like structure 10 having a substantially flat surface portion 11 with a slotted trough 12 (FIG. 4) extending longitudinally throughout substantially the length of the table-like structure 10. An auxiliary platform 13 may be provided at one end of the table-like structure 10 for supporting terminal blocks or the like in stacked relation.

Sprockets 14, 15 and 16 may be located beneath the surface 11 and a chain conveyor 17 may surround the sprockets and be driven by one or more of them to provide a conveying mechanism. The top strand of chain 17 may lie directly below the slotted trough 12, and may include spaced special links 18 (FIG. 5), each of which may include an integral arm 19 extending above the top of the chain. A pivot pin 20 may be mounted at the outer extremity of the arm 19 for pivotally supporting a link 21. The link 21 may include a stud 22 thereon for cooperation with an elevating mechanism to be described later. The link 21 may also include a plate 23 that may lie over the central portion of the chain 17 and act to maintain the link 21 in elevated position when it has been raised by the elevating mechanism to be described. The upper end of the link 21 may include a recessed portion 24 providing an edge 25 adapted to engage a terminal block when the latter is placed on the conveyor chain 17.

The construction of the links 21 is such that as the chain 17 moves upwardly around sprocket 16 (FIGS. 2 and 3), they will lie flat with the plate 23 extending vertically upwardly, or will be moved to such flat position by a stationary abutment member 23' fixed in a position to engage the lower end of the link 21 beneath the pivot 20 as each special link 18 passes the member 23'. Accordingly, as the chain 17 moves along its upper reach, the links 21 remain in a prone position unless elevated by the elevating mechanism.

Referring to FIGS. 2, 3 and 4, the elevating mechanism may comprise a link 26 fixed to an oscillatable shaft 27. The end of link 26 opposite to that fixed to shaft 27 may support a guide 28 that may extend into the path of movement of the stud 22 on the link 21 when the link 26 is in one position and may ride over the top of, and clear the stud 22 when the link 26 is in another position. Accordingly, by oscillating the shaft 27 at predetermined intervals, links 21 at predetermined intervals about the chain 17 may be caused to cooperate with the guide 28. When this occurs, the stud 22 rides up the guide 28 to a point where link 21 pivots about its pivot pin 20 and passes beyond its dead center position where it is retained by the plate 23 contacting the center portion of the chain 17.

In order to oscillate the shaft 27 at predetermined intervals, a series of cams 29, each having a different number of lands or lobes 30, may be fixed to the shaft to which the sprocket 15 is fixed. A sleeve member 31 (FIG. 4) may be splined to shaft 27 and it may include an arm 32 to the outer end of which a cam follower 33 may be mounted for cooperation with lands 30 on cams 29. A hand lever 34 may be fixed to the sleeve 31 so that it may be turned in a manner to cause follower 33 to clear the lands 30, whereupon sleeve 31 and follower 33 may be shifted axially of shaft 27 to align follower 33 with a selected one of the cams 29 to provide a different predetermined spacing of the elevated links 21 of chain 17.

Referring to FIGS. 1, 7, 7A and 8, the terminal assembly blocks may comprise a base 35 having integral therewith, upstanding threaded members 36 adapted to receive nuts 37. The nuts 37 may be fed from a hopper (not shown) along a pair of parallel paths 38 and 39 of a chute portion 40 that may be hingedly mounted by a hinge 41 to a stationary chute portion 42 leading from the hopper.

Referring to FIG. 6, the chute portion 40 may be resiliently supported by an adjustable compression spring 42A through which a threaded shaft 43 extends The threaded shaft 43 may be fixed to a cross member 44 and may pass through an enlarged hole within the terminal portion of the chute 40. A nut 45 on the bottom of screw 43 will limit the downward movement of chute 40, and spring 43 resists its upward movement.

Each of the parallel paths 38 and 39 is provided with a slot 46 therein for the reception of the upper ends of the threaded members 36 as the blocks 35 pass beneath the chute 40. Spring clip means 47 may be attached to the terminal portion of chute 40 in line with the paths 38 and 39. They may include U-shaped elements, the leg joining member of which may engage and hold in position at the end of chute 40 each successive nut 37 as it is moved along the paths 38 and 39 by engagement with the ends of the traveling threaded studs 36. The construction and arrangement of the parts may be such as to support the nuts 37 in such position that the tops of the threaded elements pick up the nuts 37 as the threaded members 36 pass along the slots 46. The combined action of the clips 47 and spring 42A affects locating nuts 37 on top of the threaded members 36 and releases the nuts 37 substantially simultaneously with the nuts 37 being engaged by stationary friction producing means 48 next adjacent to the terminal portion of the chute 40 and extending along the path of movement of the blocks 35.

Figure 8:
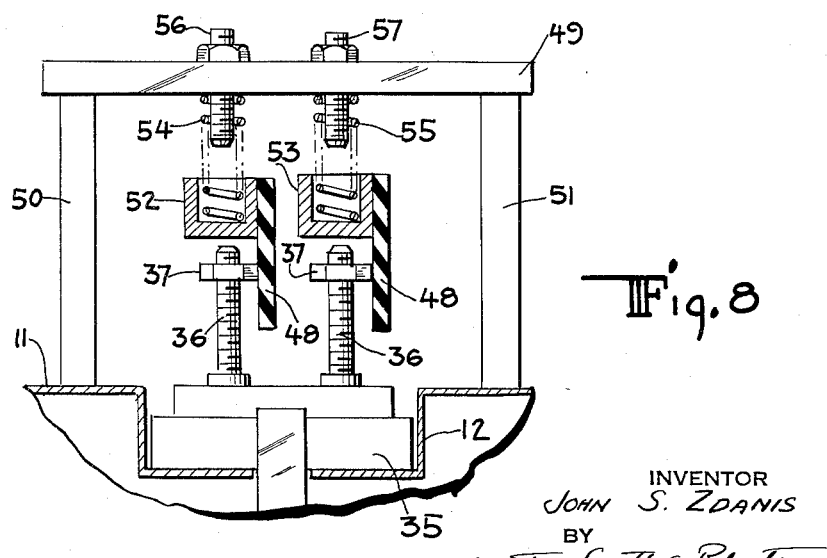
FIG. 8 is a sectional elevational view taken substantially along line 8—8 of FIGS. 2 and 3.

Referring to FIG. 8, a cross member 49 is supported by standards 50 and 51 extending from the surface 11. Blocks 52 and 53 are arranged in parallel relation along the path of travel of the terminal blocks 35. Blocks 52 and 53 are resiliently supported by springs 54 and 55 that surround shafts 56 and 57 which support blocks 52 and 53 from the cross member 49.

The friction producing means 48 may be fixed to the sides of blocks 52 and 53 in such manner that the outer periphery of the nuts 37 frictionally contact the stationary means 48 and as the blocks 35 continue on throughout their paths of motion, the nuts 37 are caused to roll along the means 48, thereby screwing downwardly on the threaded means 36.

Although the various features of the new and improved nut and screw assembling machine have been shown and described to fully disclose the details of an embodiment thereof, it is evident that changes may be made in such details and certain features may be used without others without departing from the principles of the invention.

What is claimed is:

1. In a nut and screw assembling machine, a conveyor for transporting screw means past a chute leading from a hopper containing nuts; an angularly disposed terminal portion on said chute and lying in line with the screw means that is being transported by said conveyor; adjustable resilient means for biasing said terminal portion into the path of movement of said screw means; wire clip means attached to said chute terminal portion for releasably holding a nut in position such that cooperation between said clip means and said resilient means facilitates the transfer of said nut to a screw as the latter passes said terminal portion of said chute; and nut turning means located adjacent said terminal portion of said chute in position to be effective substantially while said clip and resilient means are effective, whereby said nut is directly transferred to said turning means from the terminal portion of said chute.

2. In a nut and screw assembling machine, a conveyor for transporting screw means past a chute leading from a hopper containing nuts; an angularly disposed terminal portion of said chute lying in line with the screw means that is being transported by said conveyor; adjustable resilient means for biasing said terminal portion into the path of movement of said screw means; a slot within said terminal portion exposing the threaded hole of each nut; wire clip means connected to said chute terminal portion for releasably holding a nut in position such that the cooperation between said clip means and said resilient means facilitates the transfer of said nut to a screw as the top of the latter passes into said slot and mates with a nut held by said clip means; and nut turning means located adjacent said terminal portion of said chute in position to be effective substantially while said clip and resilient means are effective, whereby said nut is directly transferred to said turning means from the terminal portion of said chute.

3. In a nut and screw assembling machine, a conveyor for transporting screw means past a pivotally mounted chute leading from a hopper holding nuts and which chute has a terminal portion angularly disposed above said conveyor; resilient means for supporting the terminal portion of said pivoted chute; links on said conveyor at spaced intervals; means for insuring said links lying in a position of ineffectiveness as each portion of said conveyor approaches its effective position; automatic cycle means for causing predetermined links to be moved to a position of effectiveness; means for varying the cycle of operation of said automatic means for changing the predetermined links to be rendered effective; wire clip means connected to the terminal portion of said chute for releasably holding a nut in position such that the cooperation between said clip means and said resilient means facilitates the transfer of said nut to a screw as the latter passes said terminal portion of said chute; and nut turning means directly adjacent said terminal portion of said chute in position to be effective substantially while said clip and resilient means are effective.

4. In a nut and screw assembling machine, a conveyor for transporting screw means past a pivotally mounted chute leading from a hopper holding nuts and which chute has a terminal portion angularly disposed above said conveyor; resilient means for supporting the terminal portion of said pivoted chute; links on said conveyor at spaced intervals; means for insuring said links lying in a position of ineffectiveness as each portion of said conveyor approaches its effective position; a plurality of cams for causing predetermined links to be moved to a position of effectiveness; means for selectively rendering effective said cam means; wire clip means connected to said chute terminal portion for releasably holding a nut in position such that the cooperation between said clip means and said resilient means facilitates the transfer of said nut to a screw as the latter passes said terminal portion of said chute; and nut turning means directly adjacent said terminal portion of said chute in position to be effective substantially while said clip and resilient means are effective.

5. In a nut and screw assembling machine, a conveyor for transporting screw means past a chute leading from a hopper holding nuts and which chute has a terminal portion angularly disposed above said conveyor; adjustable resilient means for biasing said terminal portion into the path of movement of said screw means; links on said conveyor at spaced intervals; means for causing said links normally to lie in a position of ineffectiveness; a pivotally mounted guide in position to cooperate with means on said links for elevating them into effective position; a plurality of cam means for selectively oscillating said guide means between positions where said guide means is effective and ineffective; wire clip means attached to said chute terminal portion for releasably holding a nut in position such that the cooperation between said clip means and said resilient means facilitates the transfer of said nut to a screw as the latter passes said terminal portion of said chute; and nut turning means directly adjacent said terminal portion of said chute in position to be effective substantially while said clip and resilient means are effective.

References Cited in the file of this patent

UNITED STATES PATENTS

| | | |
|---|---|---|
| 1,390,351 | Faessel | Sept. 13, 1921 |
| 2,288,620 | Goodhue | July 7, 1942 |
| 2,386,797 | Hohl | Oct. 16, 1945 |
| 2,450,106 | Bemis | Sept. 28, 1948 |
| 2,519,434 | Buccicone | Aug. 22, 1950 |
| 2,594,207 | Pierce | Apr. 22, 1952 |
| 2,601,603 | Fisher | June 24, 1952 |
| 2,769,528 | Goodrich | Nov. 6, 1956 |
| 2,819,516 | Myers | Jan. 14, 1958 |
| 2,855,736 | Harmon et al. | Oct. 14, 1958 |

FOREIGN PATENTS

| | | |
|---|---|---|
| 789,590 | Great Britain | Jan. 22, 1958 |